United States Patent
Tanaka et al.

(10) Patent No.: US 8,602,487 B2
(45) Date of Patent: Dec. 10, 2013

(54) VEHICLE FRONT STRUCTURE AND METHOD OF MOUNTING HINGE COVER ON VEHICLE

(75) Inventors: Hirofumi Tanaka, Wako (JP); Aki Isoda, Chiyoda-ku (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/602,670

(22) Filed: Sep. 4, 2012

(65) Prior Publication Data

US 2013/0076073 A1 Mar. 28, 2013

(30) Foreign Application Priority Data

Sep. 26, 2011 (JP) ................................. 2011-209485

(51) Int. Cl.
*B62D 25/08* (2006.01)
*B62D 25/10* (2006.01)

(52) U.S. Cl.
USPC .................... 296/192; 296/193.11; 180/69.21

(58) Field of Classification Search
USPC .................. 296/193.11, 192; 180/69.2, 69.21
See application file for complete search history.

(56) References Cited

U.S. PATENT DOCUMENTS

| 7,988,224 B2 * | 8/2011 | Desai | 296/192 |
| 8,491,043 B2 * | 7/2013 | Yamagishi et al. | 296/192 |

FOREIGN PATENT DOCUMENTS

| JP | 2008-087616 A | | 4/2008 |
| JP | 2010-6255 | * | 1/2010 |
| JP | 2010-23662 | * | 2/2010 |
| JP | 2010-100166 A | | 5/2010 |

* cited by examiner

*Primary Examiner* — Dennis Pedder

(74) *Attorney, Agent, or Firm* — Westerman, Hattori, Daniels & Adrian, LLP

(57) ABSTRACT

A vehicle front structure in which a hinge cover is disposed at a lateral end of a cowl top provided between an engine hood for covering an engine compartment of a vehicle and a windshield glass. The hinge cover is configured to cover a lower end corner of the windshield glass and to prevent a hood hinge from being seen through a space between the engine hood and the cowl top. The hinge cover includes a rear fixing portion which extends from the lateral end of the cowl top rearward with respect to the vehicle, and is supported by a sealing member which extends in fore-and-aft vehicle direction at a lateral lower surface and a lateral end surface of the windshield glass.

6 Claims, 16 Drawing Sheets

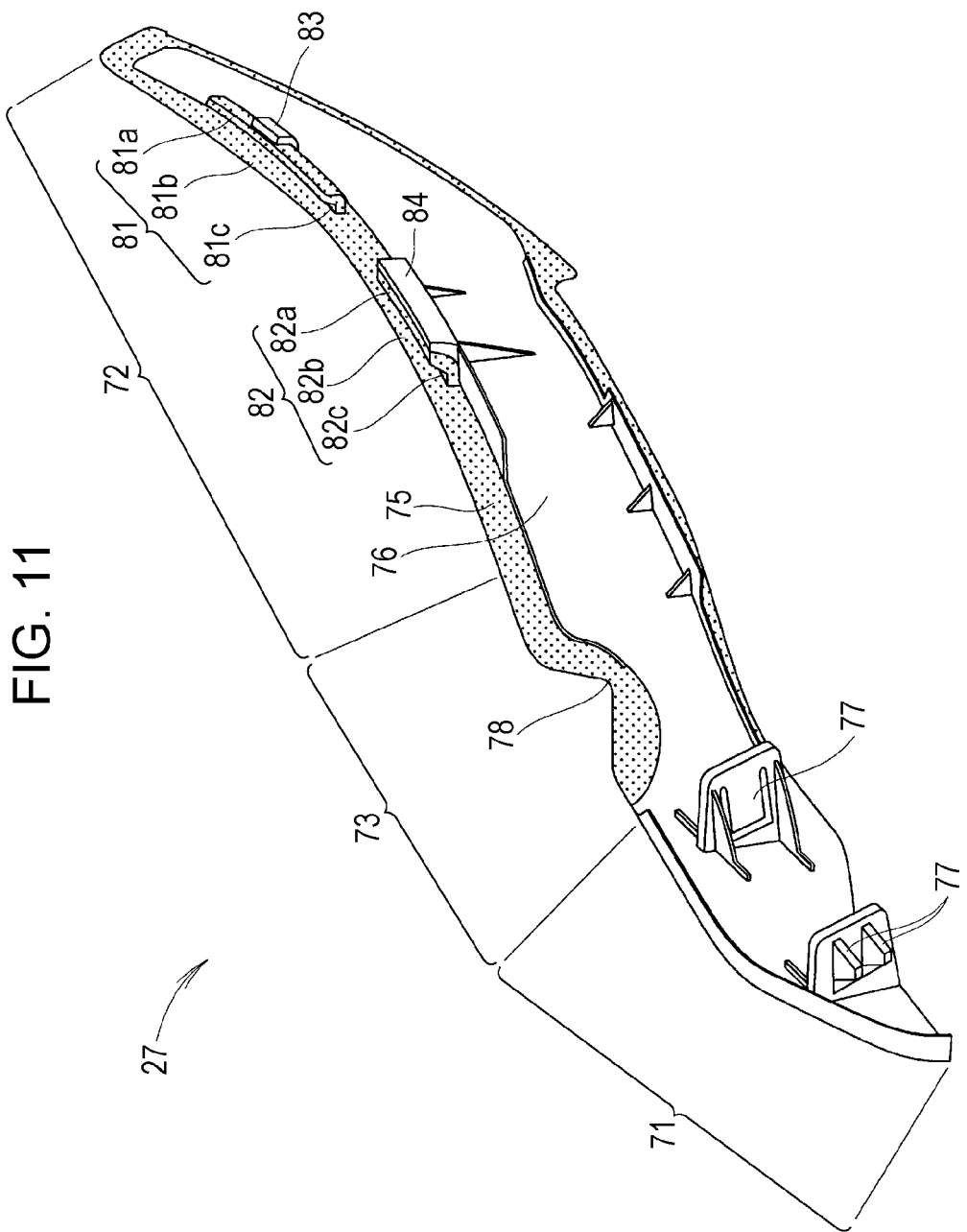

VEHICLE FRONT STRUCTURE AND METHOD OF MOUNTING HINGE COVER ON VEHICLE

CROSS REFERENCES TO RELATED APPLICATIONS

The present application claims priority under 35 U.S.C. §119 to Japanese Patent Application No. 2011-209485, filed Sep. 26, 2011, entitled "Vehicle Front Structure and Method of Mounting Hinge Cover on Vehicle." The contents of this application are incorporated herein by reference in their entirety.

TECHNICAL FIELD

The present application relates to a vehicle front structure and a method of mounting a hinge cover on a vehicle, the vehicle front structure including the hinge cover which is configured to cover a lower end corner of a windshield glass at a lateral end of a cowl top provided between an engine hood for covering an engine compartment of the vehicle and the windshield glass, and to prevent hood hinges from being seen through a space between the engine hood and the cowl top.

BACKGROUND

There is known a vehicle front structure, in which a fender cover is disposed at a lower end corner of a windshield, and a locking member provided on the rear surface side of the fender cover (hinge cover) is inserted into a space between an outer edge of the windshield in the width direction and a front pillar so as to be engaged with the outer end of the windshield in the width direction so that the fender cover is mounted on the vehicle body, where the locking member has a locking lug which can be elastically deformed. The above insertion is performed in a state where the locking lug is folded, and the locking lug, after being inserted into the space, returns to the original state from the folded state, and thus the rear surface of the outer end of the windshield in the width direction is locked in place.

According to this vehicle front structure, even in the case where the space between the outer edge of the windshield in the width direction and the front pillar is small, the fender cover can be mounted (for example, see Japanese Unexamined Patent Application Publication No. 2010-100166).

There is known another vehicle front structure which defines a mounting structure between a cowl top garnish (hinge cover) and a fender panel in a vehicle in which the fender panel extends so as to constitute part of a front pillar, the cowl top garnish extending along the front pillar from a lower end corner position of a windshield, where the cowl top garnish includes a base end which is to be fixed to the windshield; a longitudinal wall which extends upward from the base end and constitutes a partial surface of the front pillar which faces the center of the vehicle; and an engagement portion formed at an upper portion of the longitudinal wall. By engaging the extending portion of the fender panel with the engagement portion, the fender panel is mounted on the cowl top garnish.

With the above vehicle front structure, the extending portion of the fender panel can be supported by the cowl top garnish, and the rigidity of the extending portion can be improved (for example, see Japanese Unexamined Patent Application Publication No. 2008-87616).

SUMMARY

In the vehicle front structure disclosed in Japanese Unexamined Patent Application Publication No. 2010-100166, there is a requirement regarding the structure (construction) such that a portion without a sealing member needs to be prepared at the bottom surface of the windshield in order to make the locking lug fit to the windshield. Because the hinge cover is mounted at supporting points which come into contact with the glass surface, there is a possibility that the windshield may be blemished. Because the hinge cover comes into contact with the glass surface, sand or the like may be introduced to the hinge cover, and blemishes or strange noises may occur due to vibration.

Because the hinge cover occupies a large area as a functional problem, the aesthetic design is particularly poor. Rain water may stay at the lower end portion of the windshield under the hinge cover, which may cause a difficulty in discharging the rain water. The area of the lower portion of the hinge cover disposed from above is large, and thus the hinge cover is easily affected by thermal expansion of the cowl top.

In the vehicle front structure disclosed in Japanese Unexamined Patent Application Publication No. 2008-87616, there is a requirement regarding the structure (construction) such that the hinge cover comes into contact with the glass surface of the windshield, and thus work man-hours and management man-hours are increased. Because the hinge cover comes into contact with the glass surface, sand or the like may be introduced to the hinge cover, and blemishes or strange noises may occur due to vibration. Direct contact of PP (polypropylene) with the flange of the fender panel may cause paint to peel off, and rust may occur on the fender panel.

Similarly to Japanese Unexamined Patent Application Publication No. 2010-100166, the hinge cover occupies a large area as a functional problem, and thus the aesthetic design is particularly poor. Similarly to Japanese Unexamined Patent Application Publication No. 2010-100166, rain water may stay at the lower end portion of the windshield under the hinge cover, which may cause a difficulty in discharging the rain water. Similarly to Japanese Unexamined Patent Application Publication No. 2010-100166, the area of the lower portion of the hinge cover disposed from above is large, and thus the hinge cover is easily affected by thermal expansion of the cowl top.

The present application provides a vehicle front structure, in which sand or the like is not introduced to the glass design surface of the windshield glass, and even when vibration occurs, blemishes or strange noises can be prevented from being caused. In addition, the present application provides a method of mounting a hinge cover on a vehicle, in which the hinge cover can be mounted without using a member other than the hinge cover, and mounting and removing of the hinge cover can be easily performed.

According to a first aspect of an embodiment, a vehicle front structure includes a hinge cover which is configured to cover a lower end corner of a windshield glass at a lateral end of a cowl top provided between an engine hood for covering an engine compartment of a vehicle and the windshield glass, and to prevent hood hinges from being seen through a space between the engine hood and the cowl top, wherein the hinge cover includes a rear fixing portion which extends from the lateral end of the cowl top rearward with respect to the vehicle, and is supported by a sealing member which extends in fore-and-aft vehicle directions of a lateral lower surface and a lateral end surface of the windshield glass. Thus, the rear fixing portion can press the sealing member, and the hinge cover can be supported. Accordingly, contact of the hinge cover with the glass design surface of the windshield glass can be prevented. Consequently, sand or the like is not introduced, and even when vibration occurs, blemishes or strange noises can be prevented from being caused.

According to a second aspect of the embodiment, a lower end of the rear fixing portion has a locking lug which projects inwardly along a vehicle width direction, and the locking lug presses against the sealing member, thereby supporting the hinge cover. That is to say, at the rear fixing portion, the locking lug projecting inwardly along the vehicle width direction presses against the sealing member, and thus the hinge cover can be supported. Accordingly, the effect according to the first aspect of the embodiment can be provided. At the lower end of the rear fixing portion, the locking lug projecting inwardly along the vehicle width direction presses against the sealing member, thereby supporting the hinge cover. Accordingly, the rear fixing portion can be easily positioned in the vertical direction, and it is not necessary to form a portion where no sealing member is provided, in the lateral end surface (glass bonding portion). Therefore, a degree of freedom in design can be improved.

According to a third aspect of the embodiment, the hinge cover includes a front fixing portion which is fixed to the lateral end of the cowl top from the inside in the vehicle width direction. Thus, the front fixing portion can be elastically deformed to the right and left with respect to the fulcrum of the rear fixing portion which is supported by the sealing member. Consequently, even when the cowl top thermally expands, the thermal expansion of the cowl top can be absorbed by bending the front fixing portion to the right and left. By providing the hinge cover with the front fixing portion which is fixed to the lateral end of the cowl top from the inside in the vehicle width direction, the hood hinges can be hidden in the vicinity area of the front fixing portion, and thus the marketability based on appearance can be significantly improved.

According to a fourth aspect of the embodiment, the vehicle includes a front fender which is located outwardly of the lower end corner of the windshield glass, and covers a lateral side of the engine compartment, the front fender has a flange which extends below the vehicle from an inner end of the vehicle width, and a design surface of the rear fixing portion is formed along the flange. That is to say, the hinge cover is supported by the rear fixing portion pressing against the sealing member, the design surface of the rear fixing portion is formed along the flange, and thus a unitary appearance of the hinge cover with the front fender is enhanced, and the aesthetic design around the front fender can be improved. In addition, the rear fixing portion supports the hinge cover by pressing against the sealing member, and the design surface of the rear fixing portion is formed along the flange. Thus, the entire hinge cover can be formed thinner. Accordingly, the rain water that is collected on the sides of the windshield glass by the operation of the wiper device dose not stay in the lower end corners of the windshield glass. Consequently, high water discharge effect can be obtained with the window shield glass. In addition, sand or the like is not introduced, and even when vibration occurs, blemishes or strange noises can be prevented from being caused. The rear fixing portion supports the hinge cover by pressing against the sealing member, and the design surface of the rear fixing portion is formed along the flange. Thus, the entire hinge cover can be formed thinner. Accordingly, the hinge cover does not bulge over the window shield glass side. Consequently, even in the case where the wiper device is of "a tandem type", the influence on the operation range of the wiper can be avoided, and a degree of freedom in design can be increased. A tandem type wiper is a wiper in which two (tandem) wiper arms cooperate to wipe the windshield glass.

According to a fifth aspect of the embodiment, an upper end of the rear fixing portion includes a fitting channel to be fitted to the flange; and a channel support which supports one side of the fitting channel from the outside in the vehicle width direction, and wherein the fitting channel is molded with a raw material softer than the channel support, and receives and retains the flange from below. For example, direct contact of a resin member such as PP (polypropylene) with the flange of the front fender may cause formation of rust due to peeling of paint, and may cause vibration noise to occur. Because the fitting channels are molded with the raw material softer than the channel supports, and receive and retain the flange from below, formation of rust due to peeling of paint, and occurrence of vibration noise can be prevented. When the fitting channels are molded with the raw material softer than the channel supports, for example, the hood hinge inserted between the front fender and the windshield glass can be formed in a plate-like shape by double molding a resin.

According to a sixth aspect of the embodiment, a front structure of the vehicle including a hinge cover and a front fender where the hinge cover covers a lower end corner of a windshield glass at a lateral end of a cowl top provided between an engine hood for covering an engine compartment of a vehicle and the windshield glass, and prevents hood hinges from being seen through a space between the engine hood and the cowl top, and the front fender which is located outwardly of the lower end corner of the windshield glass, and has a flange which extends below the vehicle from an inner end of a vehicle width, wherein the hinge cover includes a front fixing portion which is fixed to the lateral end of the cowl top, and a rear fixing portion which extends from the lateral end of the cowl top rearward with respect to the vehicle, and wherein at the rear fixing portion, a locking lug projecting inwardly along the vehicle width direction presses against a sealing member which extends in fore-and-aft vehicle directions of a lateral lower surface and a lateral end surface of a windshield glass, and thus a fitting channel receives and retains the flange from below, thereby supporting the hinge cover, the method including: sliding the hinge cover rearward with respect to the vehicle along the flange, fitting the fitting channel to the flange, and pressing the locking lug against the sealing member; and fixing the front fixing portion to the lateral end of the cowl top from the inside in the vehicle width direction. That is to say, when the hinge cover is mounted, the hinge cover is caused to slide rearward with respect to the vehicle, the fitting channels are fitted to the flange, and the locking lugs are pressed against the sealing member in the first mounting process; and the front fixing portion is fixed to the lateral end of the cowl top from the inside in the vehicle width direction in the second mounting process. Accordingly, contact of the hinge cover with the glass design surface of the window shield glass can be prevented. Consequently, sand or the like is not introduced, and even when vibration occurs, blemishes or strange noises can be prevented from being caused. Because the hinge cover does not come into contact with the glass design surface of the window shield glass, high water discharge effect can be obtained with the window shield glass. Furthermore, there is no structure for mount on the glass design surface of the window shield glass, and thus the entire hinge cover can be formed thinner. Accordingly, the hinge cover does not bulge over the window shield glass side. Consequently, even in the case where the wiper device is of "a tandem type", the influence on the operation range of the wiper can be avoided, and a degree of freedom in design can be increased. When the hinge cover is removed, the procedure should be performed in order of the second mounting process and the first mounting process, and the hinge cover can be mounted without using a member other than the hinge cover. Thus, the mountability and removability of the hinge cover can be improved.

BRIEF DESCRIPTION OF THE DRAWINGS

The advantages of the disclosure will become apparent in the following description taken in conjunction with the following drawings.

FIG. 11 is a perspective view of the left hinge cover of the vehicle front structure illustrated in FIG. 3, the view being taken from the outside of the vehicle.

DETAILED DESCRIPTION

Figure 1:
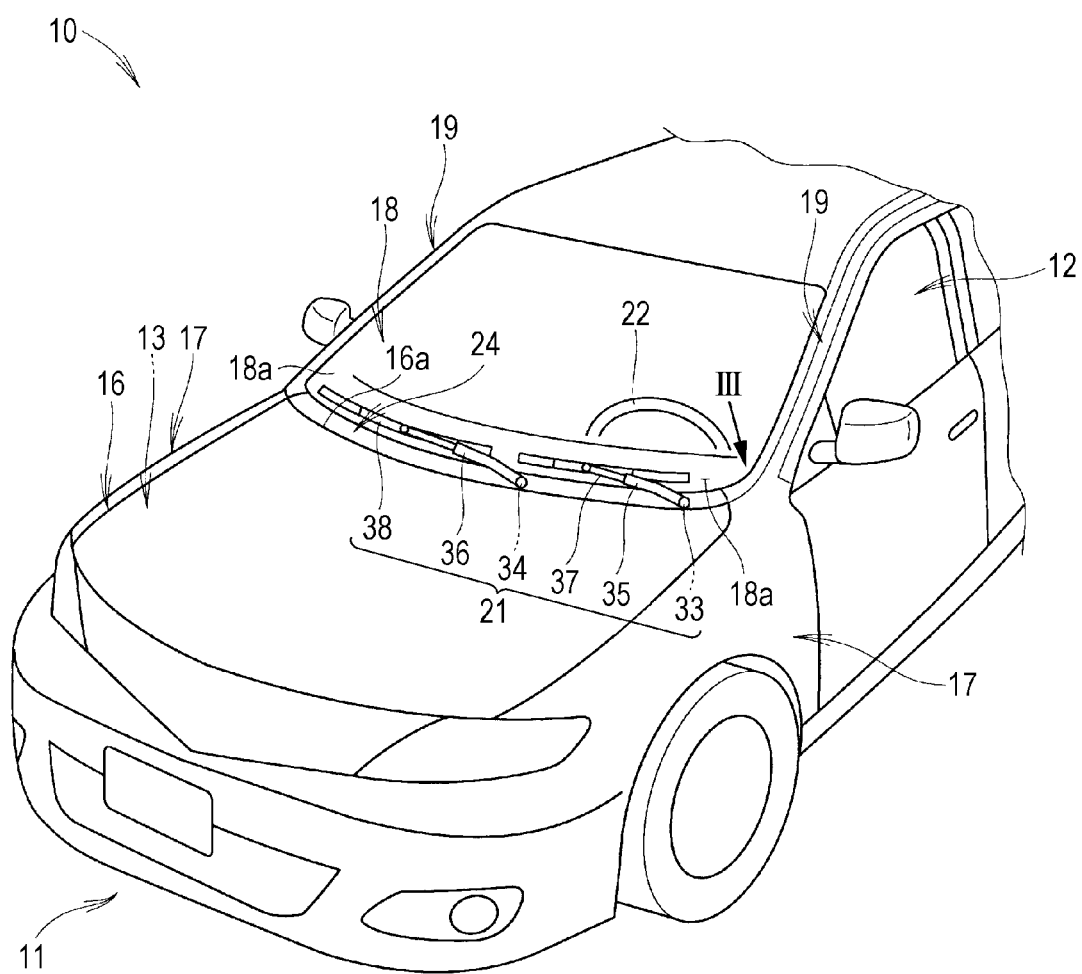
FIG. 1 is a perspective view illustrating a vehicle which adopts a vehicle front structure according to the present disclosure.
Figure 2:
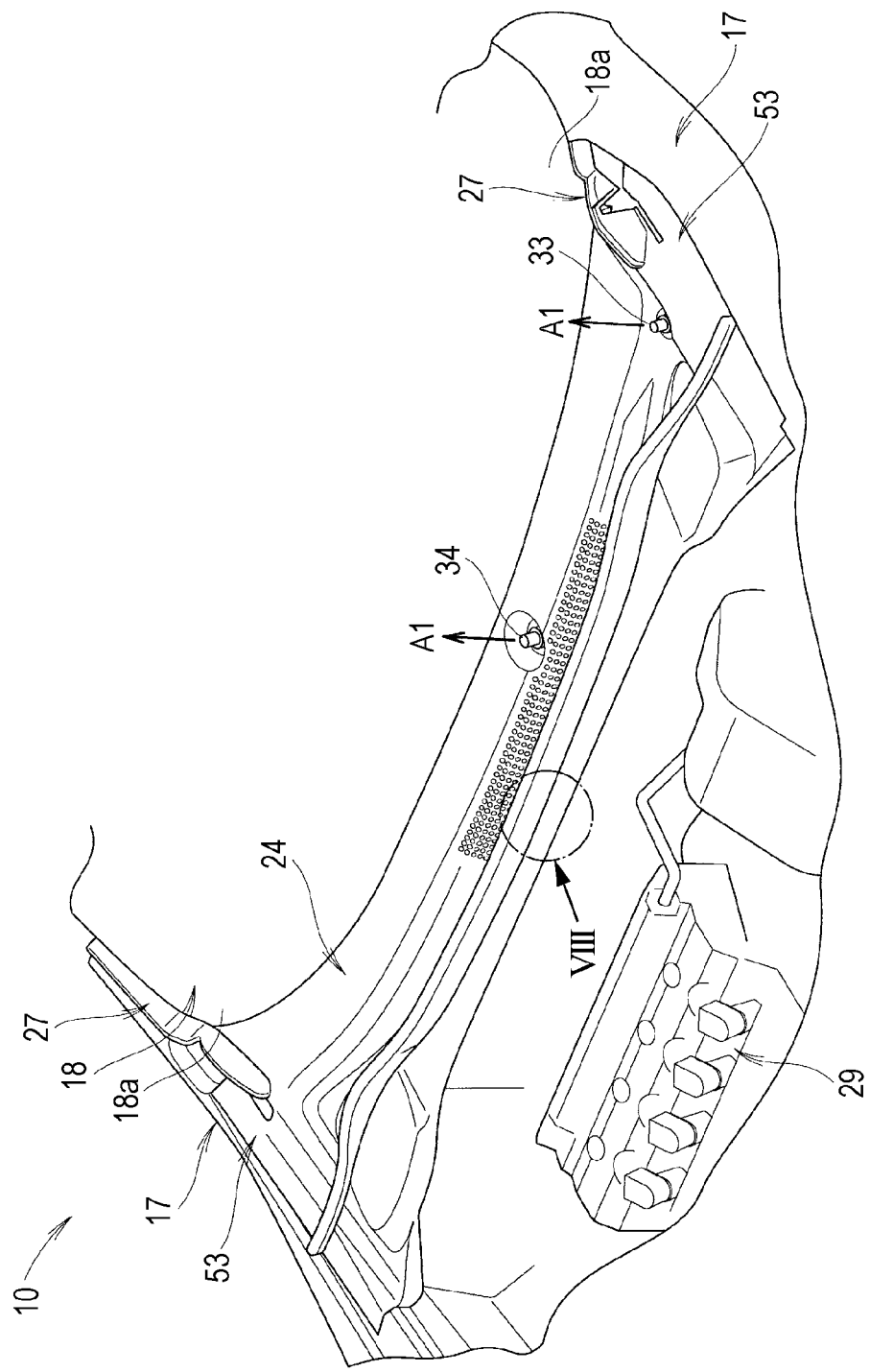
FIG. 2 is a perspective view of the vehicle front structure according to the present disclosure.

An embodiment in the present disclosure will be described below with reference to the accompanying drawings. The drawings each shall be viewed in the direction indicated by a relevant reference symbol.

Embodiment

As illustrated in FIGS. 1 to 5, a vehicle 10 includes an engine hood 16 which covers the top of an engine compartment 13 of a vehicle body 11; front fenders 17 on the right and left which cover respective sides of the engine compartment 13; a windshield glass 18 which transparently covers the front of a vehicle cabin 12; front pillars 19 on the right and left which form the framework of the front of both sides of the vehicle while supporting the windshield glass 18; a wiper device 21 which wipes the windshield glass 18; a steering wheel 22 which is provided on the front left side of the vehicle cabin 12; a cowl top 24 which is disposed between the engine hood 16 and the windshield glass 18; a cowl box 25 to which the cowl top 24 is attached (see FIG. 9); and hinge covers 27 on the right and left which prevent the hood hinges 26 on respective sides from being seen through a space S1 between the engine hood 16 and the cowl top 24, and cover lower end corners 18a of the windshield glass 18 at both lateral ends 53 of the cowl top 24.

The engine compartment 13 is provided with an engine 29 and the like. The front fenders 17 are members which are disposed outwardly of the lower end corners 18a of the windshield glass 18, and cover both sides of the engine compartment 13. The front fenders 17 each have a flange 31 which extends below the vehicle from an inner end 17a of the front fender in the vehicle width direction. In each front pillar 19, there is formed a recess 32 for joining the front pillar 19 to the windshield glass 18. In the cowl box 25, there are formed projecting portions 45 which are inserted into the cowl top 24.

The vehicle 10 is a left-hand drive vehicle such that the steering wheel 22 is located on the left side. Therefore, a left drive shaft 33 for driving a left wiper arm 35 of the wiper device 21 is disposed on the left side of the vehicle, while a right drive shaft 34 for driving a right wiper arm 36 is disposed a little to the left of the middle of the vehicle. It should be noted that in a right-hand drive vehicle, a left drive shaft for driving a left wiper arm of a wiper device is disposed a little to the right of the middle of the vehicle, while a right drive shaft for driving a right wiper arm is disposed on the right side of the vehicle.

In the vehicle front structure, the hinge covers 27 for covering the hood hinges 26 are each formed in a plate-like shape unlike in the conventional cover structure, which are interposed between the front fender 17 and the windshield glass 18, and thus the marketability based on appearance of the vehicle 10 can be significantly improved by hiding the hood hinges 26 with the plate-shaped hinge covers 27. Each plate-shaped hinge cover 27 is formed by double molding an elastic raw material 75 and a hard raw material 76 as illustrated in FIG. 10.

The wiper device 21 is a tandem type wiper in which two (tandem) wiper arms 35, 36 cooperate to wipe the windshield glass 18. More particularly, the wiper device 21 includes a wiper motor (not illustrated) as a drive source; a link mechanism (not illustrated) driven by the wiper motor; the drive shafts 33, 34 on the right and left which are rotated by the link mechanism; the wiper arms 35, 36 on the right and left which are attached to the drive shafts 33, 34 on the right and left, respectively; and wiper blades 37, 38 on the right and left which are attached to the wiper arms 35, 36 on the right and left, respectively. Wiper rubbers (not illustrated) on the right and left are attached to the wiper blades 37, 38 on the right and left in order to wipe the windshield glass 18.

Lateral lower surfaces 41 of the windshield glass 18 are attached to the front pillars 19 on the right and left via a sealing member (sealer) 44; the upper end surface is attached to a front roof rail (not illustrated) via a sealing member (not illustrated); and the lower end surface is supported by the cowl box 25 via a sealing member (not illustrated). The sealing member 44 with which the windshield glass 18 is provided extends in the fore-and-aft vehicle direction of the lateral lower surfaces 41 and lateral end surfaces 42 of the windshield glass 18.

As illustrated in FIGS. 6 to 9, the cowl top 24 includes a left end through hole 51 which faces the left drive shaft 33 (see FIG. 1); a left middle through hole 52 which faces the right drive shaft 34 (see FIG. 1); a left attachment portion 54 which is provided at the left lateral end 53 for attaching the left hinge cover 27; a right attachment portion 54 (not illustrated) which is provided at the right lateral end 53 for attaching the right hinge cover 27; a plurality of clip holes 56 into each of which a clip 55 is inserted in order to secure the cowl box 25; cap recesses 58, 58 into which cowl top caps 57, 57 (see FIGS. 7 and 16) for covering the clips 55 in a visible range are placed in place; hinge notches 59, 59 on the right and left, which face the hood hinges 26; and an insertion portion 61 in which the projecting portions 45 on the cowl box 25 are inserted.

The projecting portions 45 on the cowl box 25 are protrusions projecting toward the front of the vehicle, and the cowl top 24 can be removed by sliding it frontward of the vehicle relative to the cowl box 25. Locking holes 62, 62 for locking the left hinge cover 27 are formed in the left attachment portion 54. The right attachment portion 54 is formed symmetrically to the left attachment portion 54 with respect to the center of the vehicle.

Figure 3:
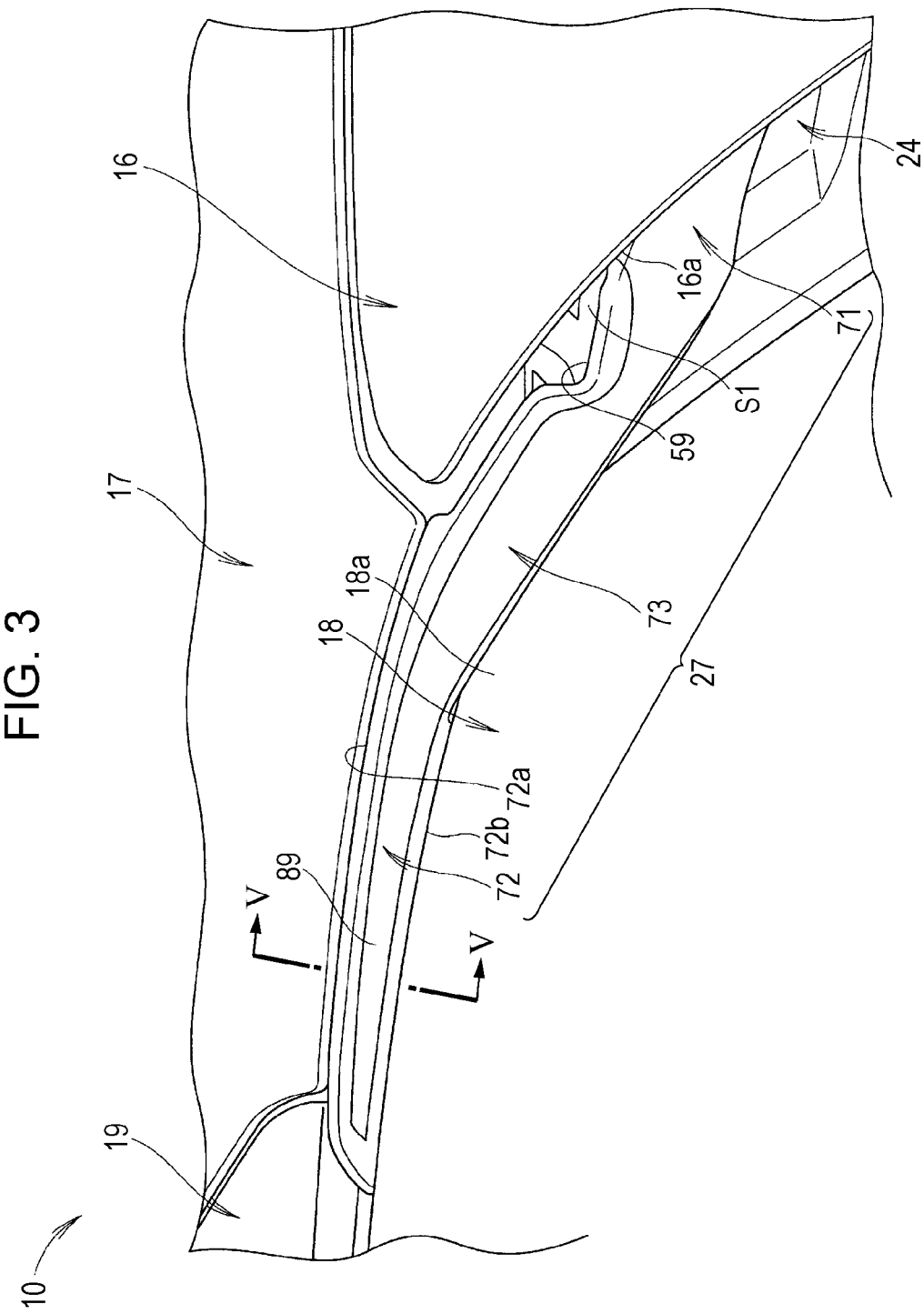
FIG. 3 is a view in the direction of an arrow III in FIG. 1.

As illustrated in FIGS. 1 to 6, and FIGS. 10 to 12, the left hinge cover 27 is a member which covers the lower end corner 18a of the windshield glass 18, and prevents the hood hinge 26 from being seen through the space S1 between the engine hood 16 and the cowl top 24. The hinge cover 27 is disposed inside the hood hinge 26. As shown in FIG. 3, the hinge cover 27 covers the lower end corner 18a of the windshield glass 18 with a space between the front surface of the windshield glass 18 and the lower surface of the hinge cover. The left hinge cover 27 further includes a front fixing portion 71 which is fixed to the lateral end 53 of the cowl top 24 from the inside in the vehicle width direction; a rear fixing portion 72 which extends from the lateral end 53 of the cowl top 24 rearward with respect to the vehicle, and is supported by the sealing member 44 extending in the fore-and-aft vehicle directions of the lateral lower surface 41 and the lateral end surface 42 of the windshield glass 18; and an intermediate connection portion 73 which connects the front fixing portion 71 to the rear fixing portion 72.

The left hinge cover 27 is formed in a plate-like shape and a substantially S-shape in a plan view (see FIG. 12), and is formed by double molding the elastic raw material 75 and the hard raw material 76. The front fixing portion 71 is positioned in the innermost in the vehicle width direction. The intermediate connection portion 73 extends gradually outward. Thermoplastic elastomer is used as the hard raw material 76, and polypropylene (PP) is used as the hard raw material 76. The right hinge cover 27 is formed symmetrically to the left hinge cover 27 with respect to the center of the vehicle.

Figure 12:
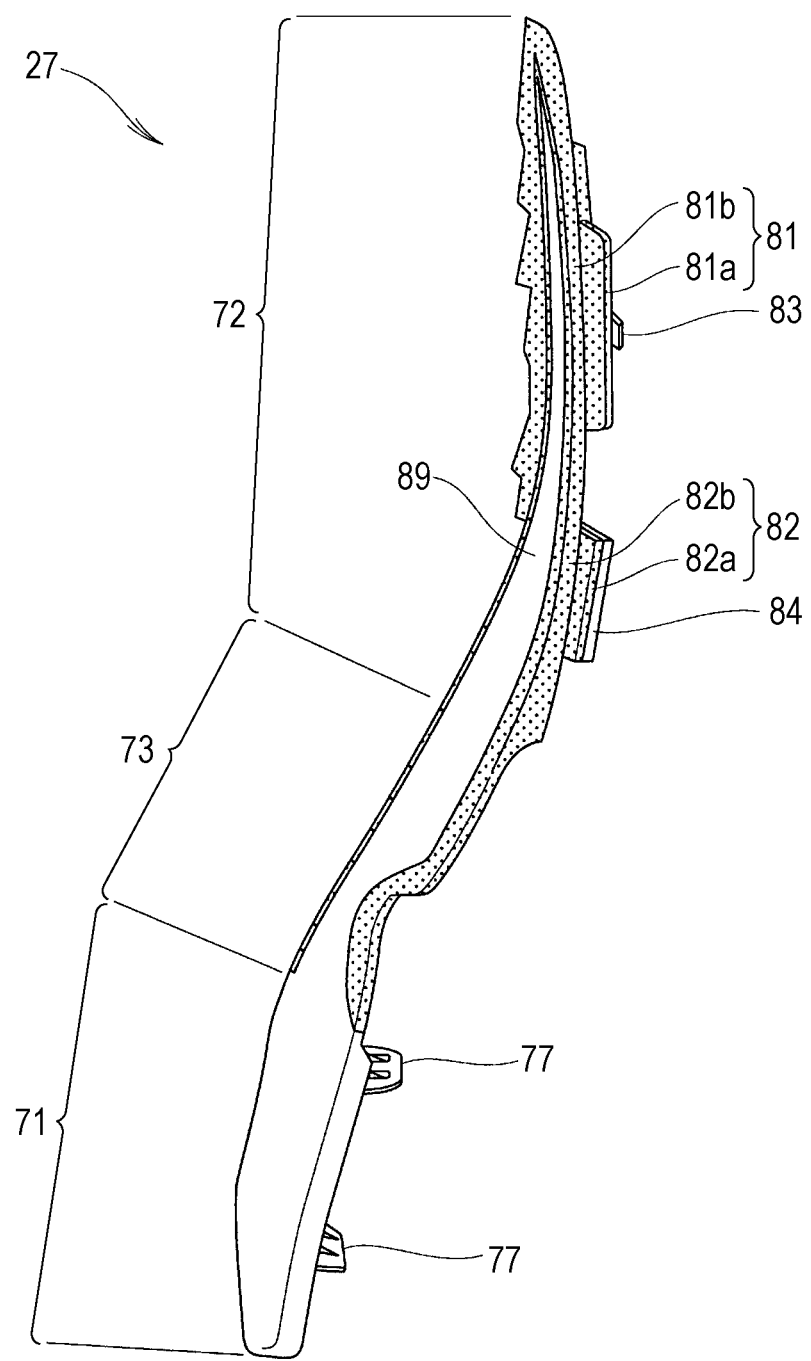
FIG. 12 is a plan view of the left hinge cover of the vehicle front structure illustrated in FIG. 3.

That is to say, the hinge covers 27 are each integrally formed by combining different materials of the thermoplastic elastomer 75 and the polypropylene 76. In FIG. 12, the portion shaded with dot (point) hatching is composed of thermoplastic elastomer 75, and the other portion is composed of the PP (polypropylene) 76.

For example, in the case where the hinge cover 27 is made of only the polypropylene 76, when the hinge cover 27 is installed, a painted part such as the front fender 17 or the front pillar 19 may be damaged and rust may be caused. In the case where the hinge cover 27 is made of only the thermoplastic elastomer 75, it is difficult to maintain the shape of the hinge cover 27, and reduction in attachment performance and intensity is inevitable when the hinge cover 27 is attached to another part such as the cowl top 24, and loose assembly may be caused. Because direct contact of polypropylene, i.e., the hard raw material 76 with the flange 31 of the front fender 17 may cause paint to peel off, the thermoplastic elastomer 75 is disposed inwardly of the hinge cover 27.

The front fixing portion 71 is provided with clip lugs (engaging lugs) 77, 77 which lock into the locking holes 62, 62 (see FIG. 7) provided outwardly of the cowl top 24 in the vehicle width direction. The front fixing portion (the front end of the hinge cover 27) 71 is fixed to the cowl top 24 from the inside in the vehicle width direction, and thus even when the cowl top 24 thermally expands, the thermal expansion of the cowl top 24 can be absorbed by bending of the front fixing portion 71 to the right and left.

In the intermediate connection portion 73, there is formed a notch 78 for avoiding the rear end 16a of the engine hood 16 when the engine hood 16 is opened or closed. That is to say, the rear end 16a of the engine hood 16 does not come into contact with the hinge cover 27.

In an upper end 72a of the rear fixing portion 72, there are formed first and second fitting channels 81, 82 to be fitted to the flange 31, and first and second channel supports 83, 84 which respectively support the one sides 81a, 82a of the first and second fitting channels 81, 82 from the outside in the vehicle width direction.

The first and second fitting channels 81, 82, which are molded with the raw material (thermoplastic elastomer) 75 softer than the first and second channel supports 83, 84, receive and retain the flange 31 from below. That is to say, the flange 31 of the front fender 17 comes into contact with the thermoplastic elastomer 75, thereby preventing formation of rust due to peeling of paint on the front fender 17, and occurrence of strange noises caused by vibration.

Particularly, the sides 81a, 82a of the first and second fitting channels 81, 82 are formed in a rib shape, and are respectively supported by the channel supports 83, 84 from the outside in the vehicle width direction, the channel supports 83, 84 being composed of the hard raw material (polypropylene) 76. Other sides 81b, 82b of the first and second fitting channels 81, 82 are formed in a lug shape, and come into contact with the flange 31 from the inside in the vehicle width direction to be elastically deformed. Bottoms 81c, 82c of the fitting channels 81, 82 are spaced apart from an edge 31c of the flange 31. The ends of the lug-shaped other sides 81b, 82b of the fitting channels 81, 82 are pressed inwardly against the flange 31 by the elastic deformation.

A locking lug 87 at a lower end 72b of the rear fixing portion 72 is molded with the elastic raw material (thermoplastic elastomer) 75, and presses against the sealing member 44. In the rear fixing portion 72, the fitting channels 81, 82 at the upper end 72a are fitted to the flange 31, and the locking lug 87 at the lower end 72b presses against the sealing member 44, thereby supporting the rear fixing portion 72 of the hinge cover 27. In addition, in the rear fixing portion 72, a design surface 89 of the hinge cover 27 is formed along the flange 31 of the front fender 17.

Figures 10A, 10B:
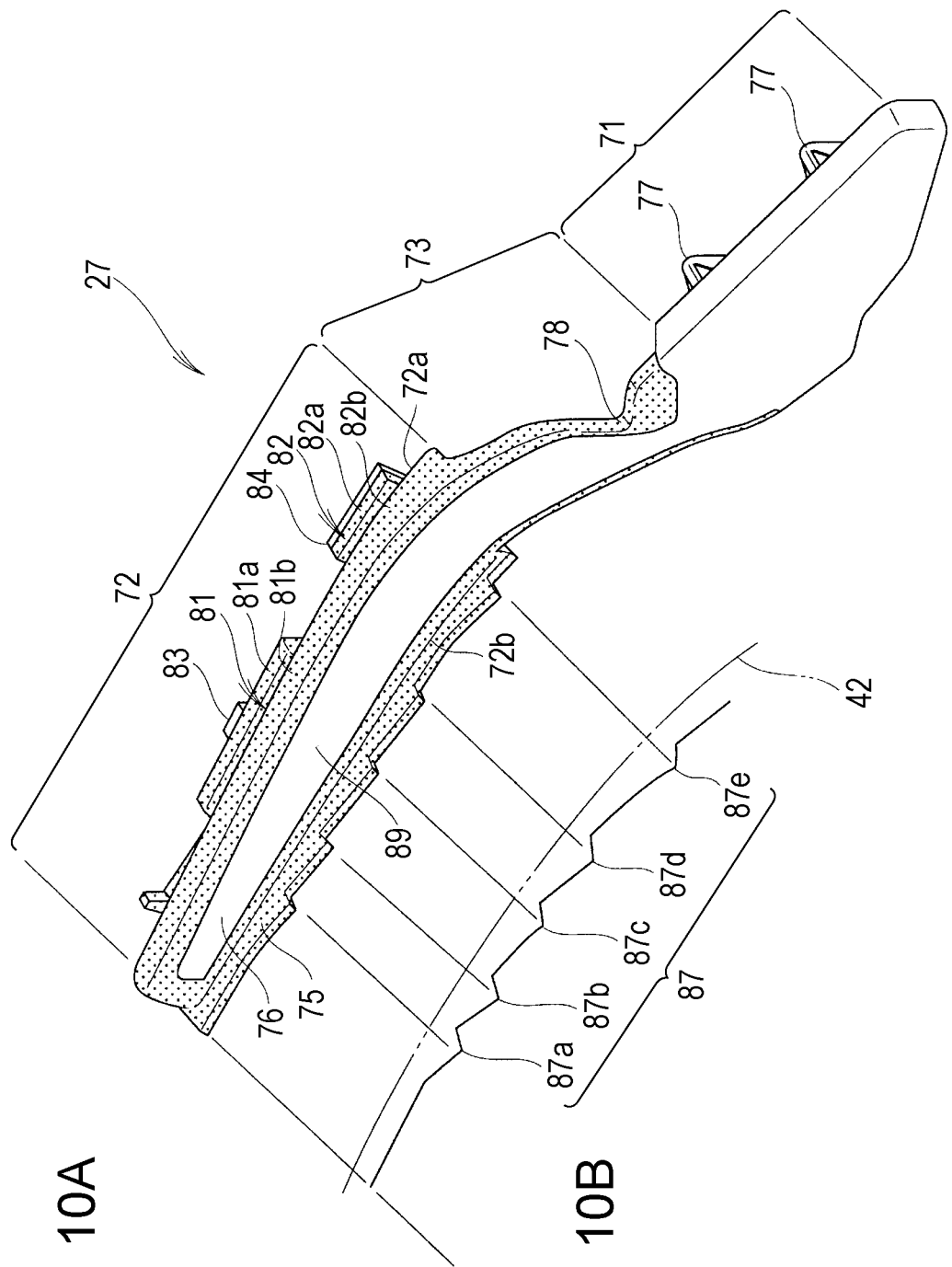
FIG. 10 is a perspective view of a left hinge cover of the vehicle front structure illustrated in FIG. 3, the view being taken from the inside of the vehicle.

FIG. 10A is a perspective view of the left hinge cover 27, taken from the inside in the vehicle width direction, and FIG. 10B is an illustrative view of the shape of the locking lug 87. As illustrated in FIG. 10B, the locking lug 87 is a saw-like fixed lug in plan view, and includes a plurality of lugs 87a to 87e that are inclined along the lateral end surface (vehicle width end line) 42 of the windshield glass 18. A take-in length of the sealing member 44 is set to approximately 0.5 mm.

The upper end 72a of the rear fixing portion 72 is fitted to the flange 31 which extends below from the inside of the front fender 17 in the vehicle width direction, and thus the left hinge cover 27 is positioned in the vehicle width direction. Particularly, the one sides (ribs) 81a, 82a of the fitting channels 81, 82 are disposed on an outer surface 31a of the flange 31 of the front fender 17, while the other sides (lugs) 81b, 82b of the fitting channels 81, 82 are pressed against an inner surface 31b of the flange 31 of the front fender 17, and thus the left hinge cover 27 is positioned in the vehicle width direction. It should be noted that the inner surface 31b of the flange 31 is at the same location as the inner end of vehicle width 17a of the front fender 17.

The lower end 72b of the rear fixing portion 72 is engaged with the sealing member (sealer for bonding) 44 which joins the windshield glass 18 to the recess 32 of the front pillar 19. The rear fixing portion 72 is positioned in the vertical direction with the upper end 72a and the lower end 72b. That is to say, the rear fixing portion 72 is not in contact with a glass design surface 88 of the windshield glass 18. Therefore, sand or the like is not introduced, and even when vibration occurs, blemishes or strange noises are not caused.

Again, the rear fixing portion 72 can be easily positioned in the vertical direction with the upper end 72a and the lower end 72b, and it is not necessary to form a portion where no sealing member (sealer) 44 is provided, in the lateral end surface 42 of the windshield glass 18, and thus a degree of freedom in design increases.

Figure 15:
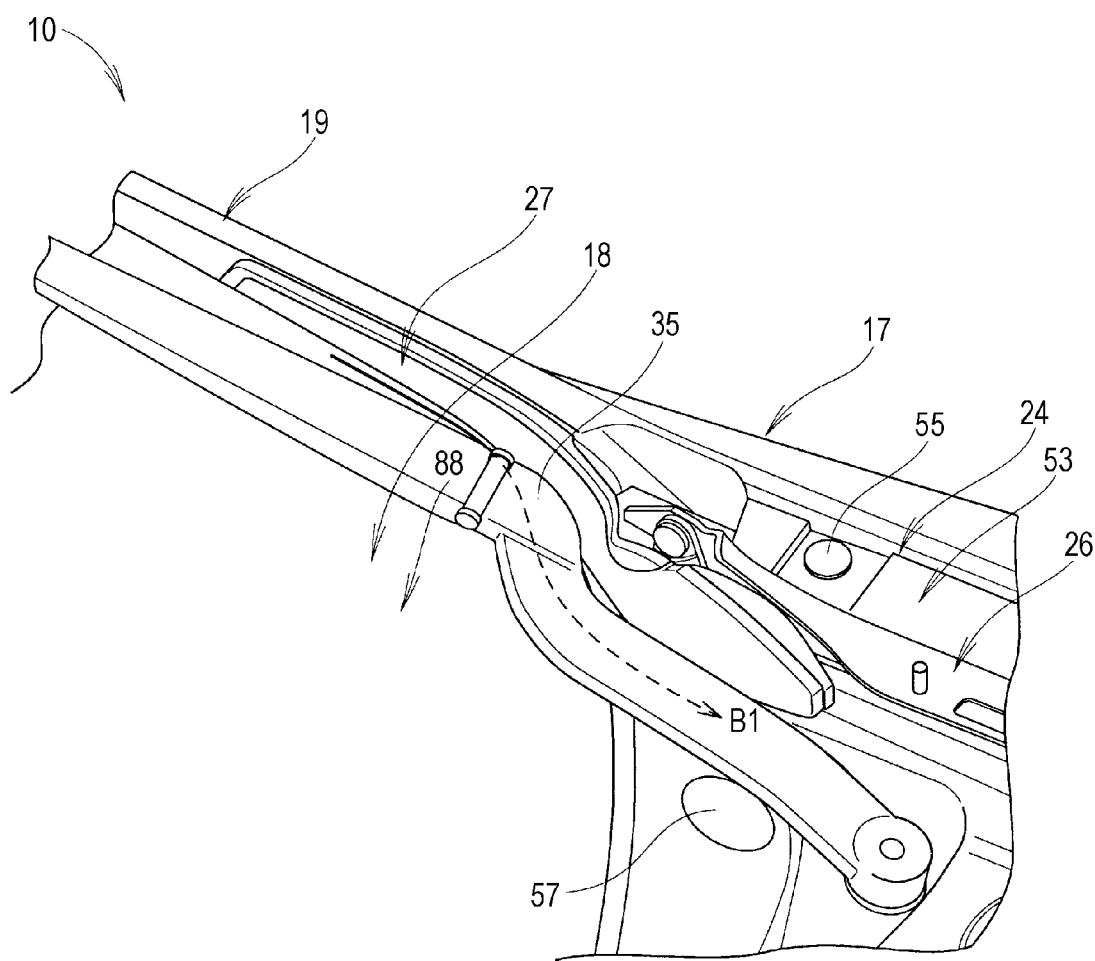
FIG. 15 is an illustrative view of the left side of the vehicle front structure illustrated in FIG. 3.

Because the design surface 89 of the rear fixing portion 72 is formed along the flange 31 of the front fender 17 as illustrated in FIG. 15, rain water can flow as indicated by an arrow B1 on the windshield glass 18 below the left wiper arm 35. Consequently, the rain water does not stay on the windshield glass 18, and thus water discharge effect is increased.

As illustrated in FIG. 12, the hinge cover 27 is formed in a substantially S-shape in a plan view, and is intended to provide a unitary appearance with the front fender 17 (see FIG. 3). Thus the hinge cover 27 is not so noticeable, and the aesthetic design of the vehicle 10 improves. The hinge cover 27 has the intermediate connection portion 73 which connects the front fixing portion 71 to the rear fixing portion 72, and the intermediate connection portion 73 allows sufficient elastic deformation, thereby contributing to absorbing thermal expansion of the cowl top 24.

Figure 16:
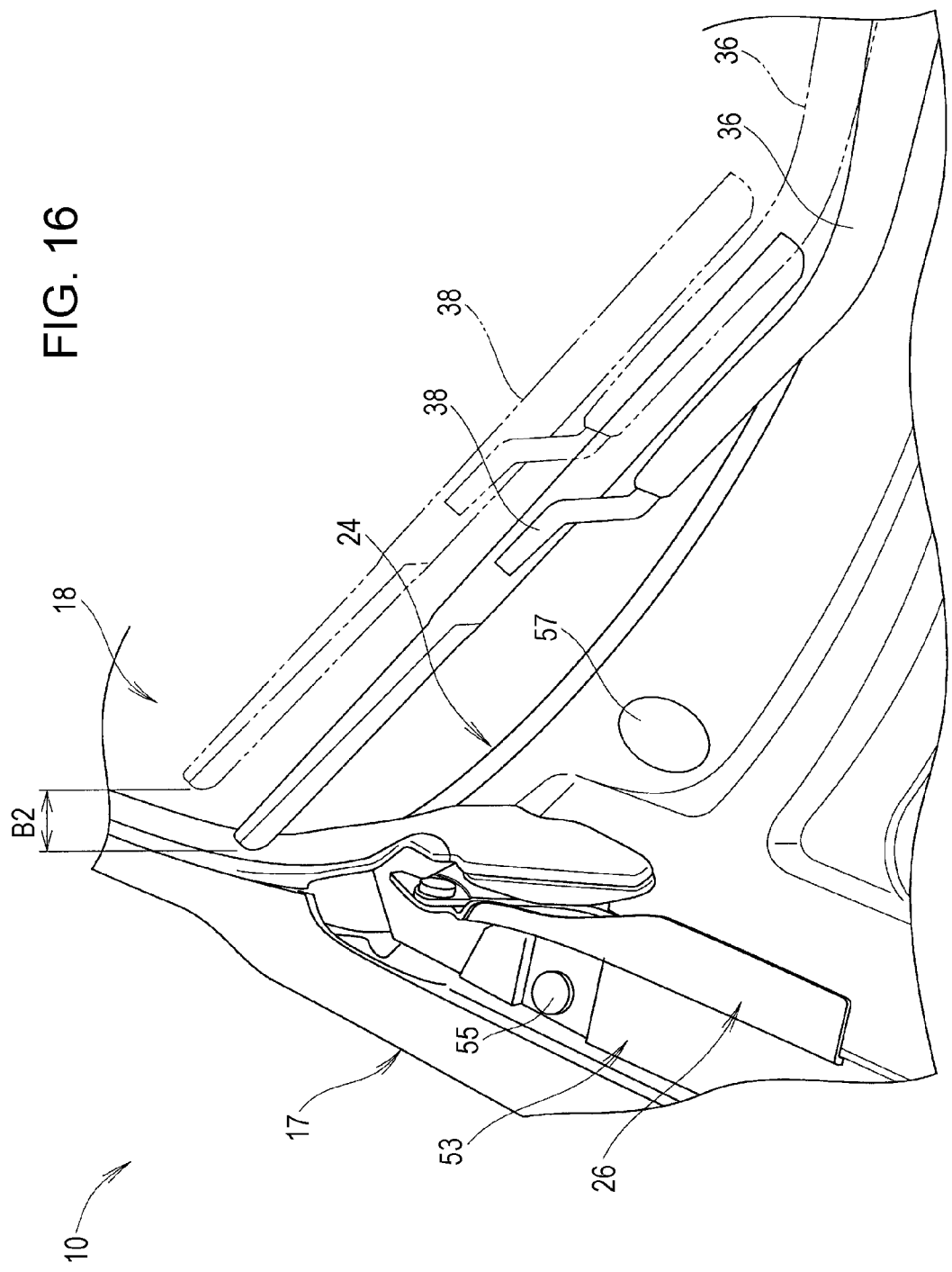
FIG. 16 is an illustrative view of the right side of the vehicle front structure illustrated in FIG. 3.

Because the hinge cover 27 is formed in a plate-like shape as illustrated in FIG. 16, the width of the hinge cover 27 in the vehicle width direction is thin, and does not bulge over the windshield glass 18. By adopting the configuration according to the present embodiment, the wiper arm 36 and wiper blade 38 can be shifted outwardly in the vehicle width direction by a dimension of B2. Therefore, even in the case where the wiper device 21 is of "a tandem type", possible long stroke of the wiper device 21 can be well taken into consideration. That is to say, the influence on the operation range of the wiper is minor, and a degree of freedom in design can be maintained.

As illustrated in FIGS. 1 to 6, in the vehicle front structure, the hinge cover 27 is disposed, which covers the lower end corners 18a of the windshield glass 18 at the lateral end 53 of the cowl top 24 provided between the engine hood 16 for covering the engine compartment 13 of the vehicle 10 and the windshield glass 18, and prevents the hood hinge 26 from being seen through the space S1 between the engine hood 16 and the cowl top 24.

The hinge cover 27 has the rear fixing portion 72 which extends from the lateral end 53 of the cowl top 24 rearward with respect to the vehicle, and is supported by the sealing member 44 extending in the fore-and-aft vehicle directions of the lateral lower surface 41 and the lateral end surface 42 of the windshield glass 18, and thus the rear fixing portion 72 can press against the sealing member 44, and can support the hinge cover 27. Accordingly, contact of the hinge cover 27 with the glass design surface 88 of the windshield glass 18 can be prevented. Consequently, sand or the like is not introduced, and even when vibration occurs, blemishes or strange noises can be prevented from being caused.

Figure 5:
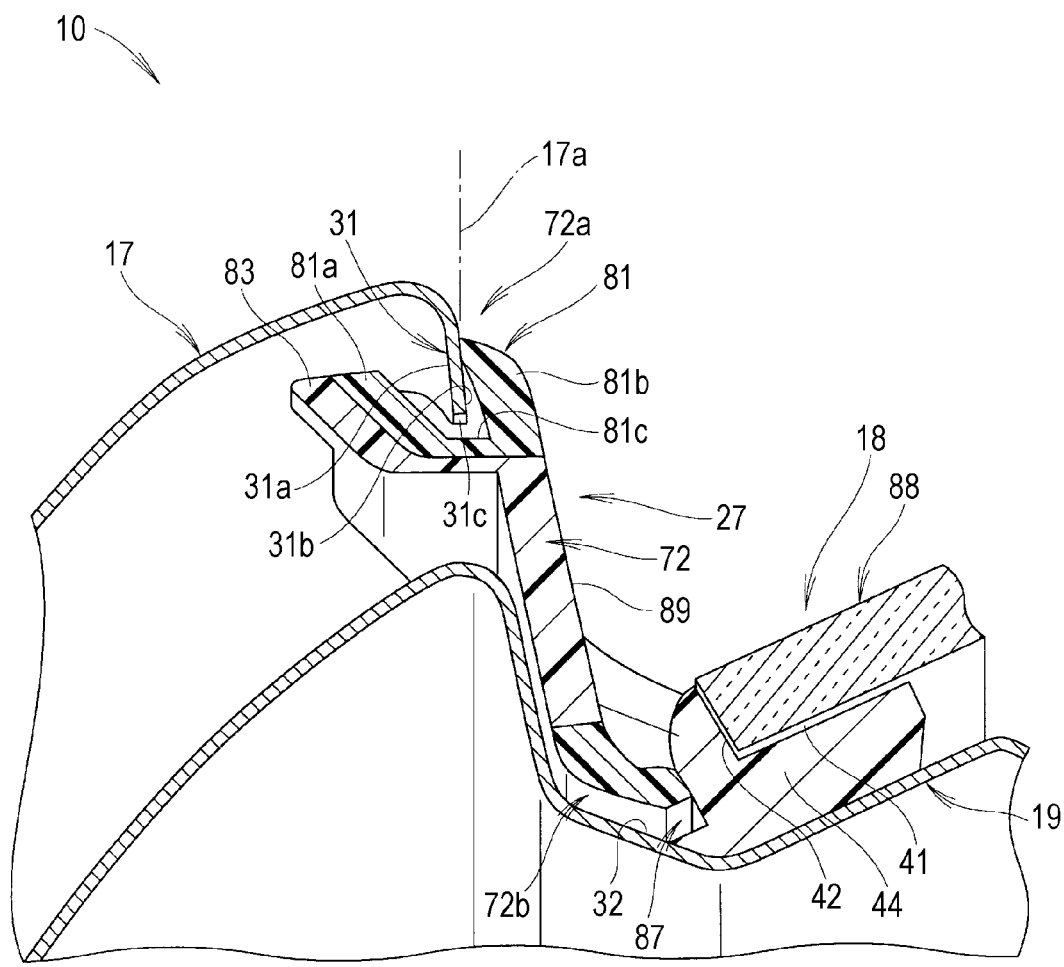
FIG. 5 is a cross-sectional view taken along a line V-V in FIG. 3.

As illustrated in FIGS. 5 and 10, in the vehicle front structure, the lower end 72b of the rear fixing portion 72 has the locking lugs 87 which project inwardly along the vehicle width direction, and thus the locking lugs 87 press against the sealing member 44, thereby supporting the hinge cover 27.

That is to say, in the rear fixing portion 72, the locking lugs 87 projecting inwardly along the vehicle width direction press against the sealing member 44, and thus the hinge cover 27 can be supported. Accordingly, the rear fixing portion 72 can further press the sealing member 44, and can support the hinge cover 27 more firmly.

At the lower end 72b of the rear fixing portion 72, the locking lugs 87 projecting inwardly along the vehicle width direction press against the sealing member 44, and thus the hinge cover 27 is supported. Accordingly, the rear fixing portion 72 can be easily positioned in the vertical direction, and it is not necessary to form a portion where no sealing member 44 is provided, in the lateral end surface (glass bonding portion). Therefore, a degree of freedom in design increases.

Figure 4:
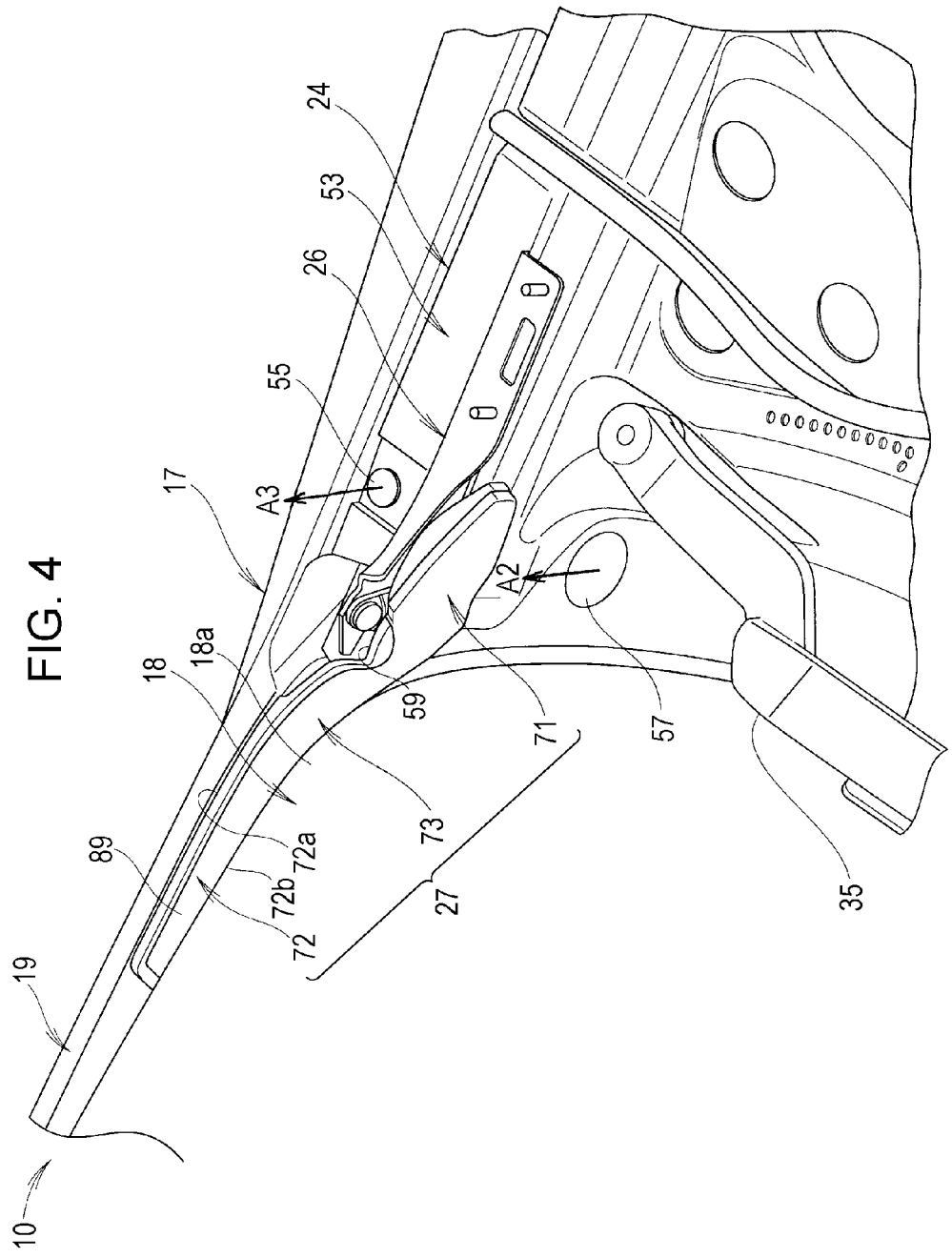
FIG. 4 is a left perspective view of the vehicle front structure illustrated in FIG. 2.
Figure 13:
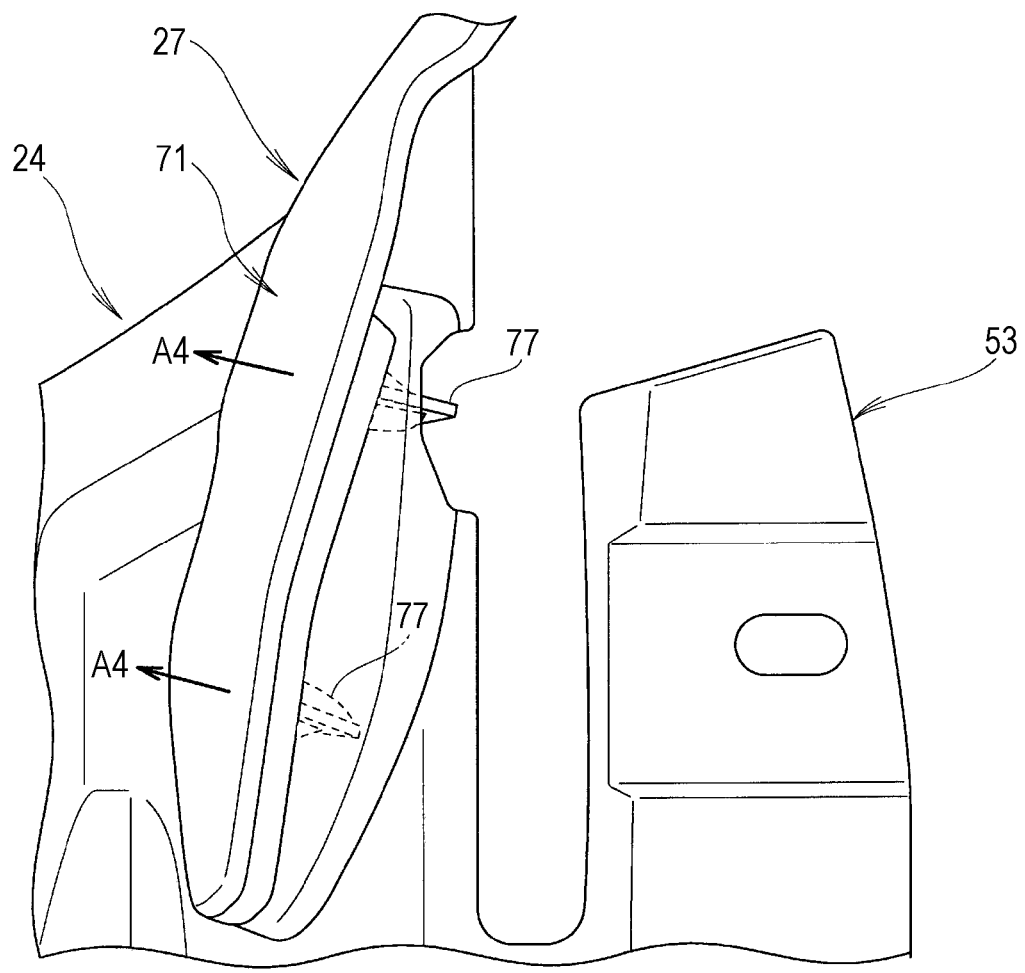
FIG. 13 is a perspective view illustrating a front fixing part of the vehicle front structure illustrated in FIG. 3.

As illustrated in FIGS. 4, 10, and 13, in the vehicle front structure, the hinge cover 27 has the front fixing portion 71 which is fixed to the lateral end 53 of the cowl top 24 from the inside in the vehicle width direction. The front fixing portion 71 can be elastically deformed to the right and left at the fulcrum of the rear fixing portion 72 which is supported by the sealing member 44. Consequently, even when the cowl top 24 thermally expands, the thermal expansion of the cowl top 24 can be absorbed by bending the front fixing portion 71 to the right and left.

By providing the hinge cover 27 with the front fixing portion 71 which is fixed to the lateral end 53 of the cowl top 24 from the inside in the vehicle width direction, the hood hinges 26 can be hidden in the vicinity area of the front fixing portion 71, and thus the marketability based on appearance can be significantly improved.

Figure 6:
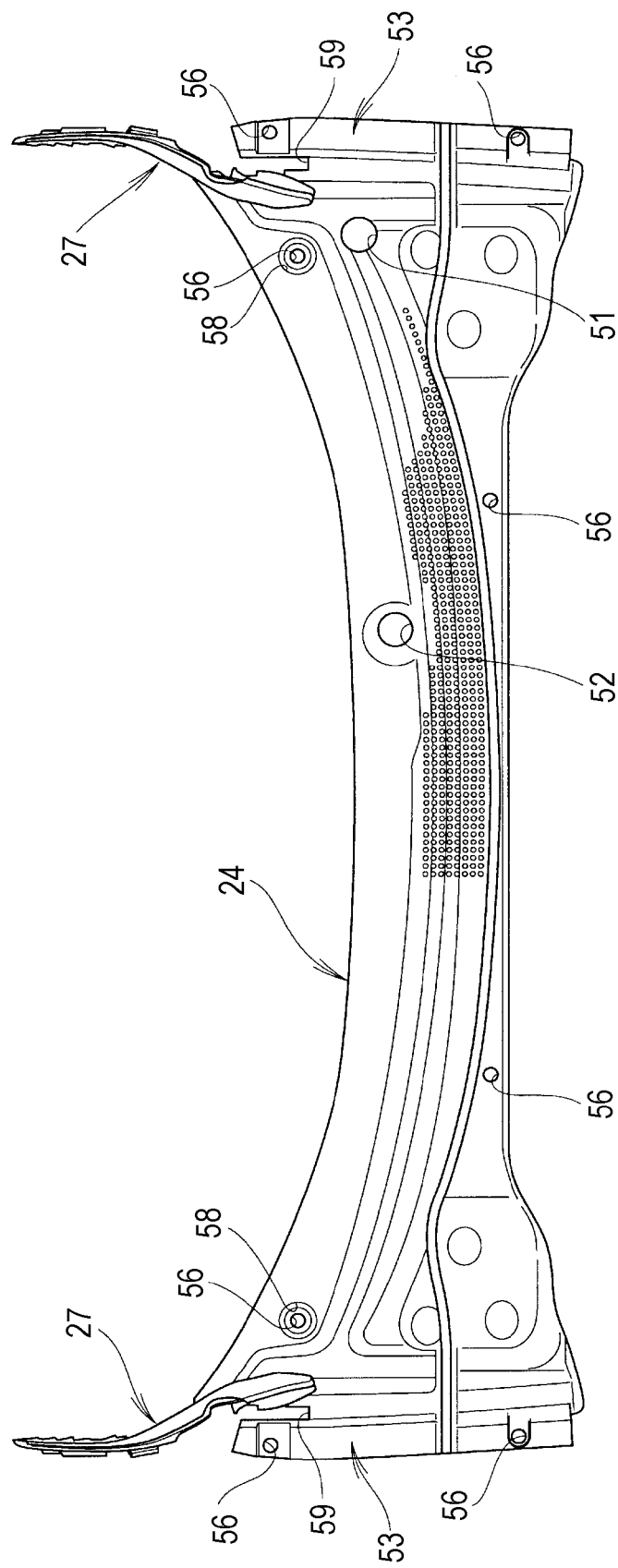
FIG. 6 is a plan view of the vehicle front structure illustrated in FIG. 3.

As illustrated in FIGS. 3 and 6, in the vehicle front structure, the vehicle 10 is provided with the front fenders 17 which are located outwardly of the lower end corners 18a of the windshield glass 18, and cover the lateral sides of the engine compartment 13. The front fenders 17 each have the flange 31 which extends below the vehicle from the inner end of vehicle width 17a, and the design surface 89 of the rear fixing portion 72 is formed along the flange 31.

That is to say, the hinge cover 27 is supported by the rear fixing portion 72 pressing against the sealing member 44, the design surface 89 of the rear fixing portion 72 is formed along the flange 31, and thus a unitary appearance of the hinge cover 27 with the front fender 17 is enhanced, and the aesthetic design around the front fender 17 can be improved.

In addition, the rear fixing portion 72 supports the hinge cover 27 by pressing against the sealing member 44, and the design surface 89 of the rear fixing portion 72 is formed along the flange 31. Thus, the entire hinge cover 27 can be formed thinner. Accordingly, the rain water that is collected on the sides of the windshield glass 18 by the operation of the wiper device 21 dose not stay in the lower end corners 18a of the windshield glass 18. Consequently, higher water discharge effect can be obtained with the windshield glass 18. In addition, sand or the like is not introduced, and even when vibration occurs, blemishes or strange noises can be prevented from being caused.

The rear fixing portion 72 supports the hinge cover 27 by pressing against the sealing member 44, and the design surface 89 of the rear fixing portion 72 is formed along the flange 31. Thus, the entire hinge cover 27 can be formed thinner. Accordingly, the hinge cover 27 does not bulge over the windshield glass 18 side. Consequently, even in the case where the wiper device 21 is of "a tandem type", the influence on the operation range of the wiper can be avoided, and a degree of freedom in design can be increased. A tandem type wiper is a wiper in which two (tandem) wiper arms 35, 36 cooperate to wipe the windshield glass 18.

As illustrated in FIGS. 6 and 10, in the vehicle front structure, the upper end 72a of the rear fixing portion 72 is provided with the fitting channels 81, 82 to be fitted to the flange 31, and the channel supports 83, 84 which respectively support the one sides 81a, 82a of the fitting channels 81, 82 from the outside in the vehicle width direction, and the fitting channels 81, 82, which are molded with the raw material 75 softer than the channel supports 83, 84, receive and retain the flange 31 from below.

For example, direct contact of a resin member such as PP (polypropylene) with the flange 31 of the front fender 17 may cause formation of rust due to peeling of paint, and may cause vibration noise to occur. Because the fitting channels 81, 82 are molded with the raw material 75 softer than the channel supports 83, 84, and receive and retain the flange 31 from below, formation of rust due to peeling of paint, and occurrence of vibration noise can be prevented.

When the fitting channels 81, 82 are molded with the raw material 75 softer than the channel supports 83, 84, for example, the hood hinge 26 inserted between the front fender 17 and the windshield glass 18 can be formed in a plate-like shape by double molding a resin.

Figure 17:
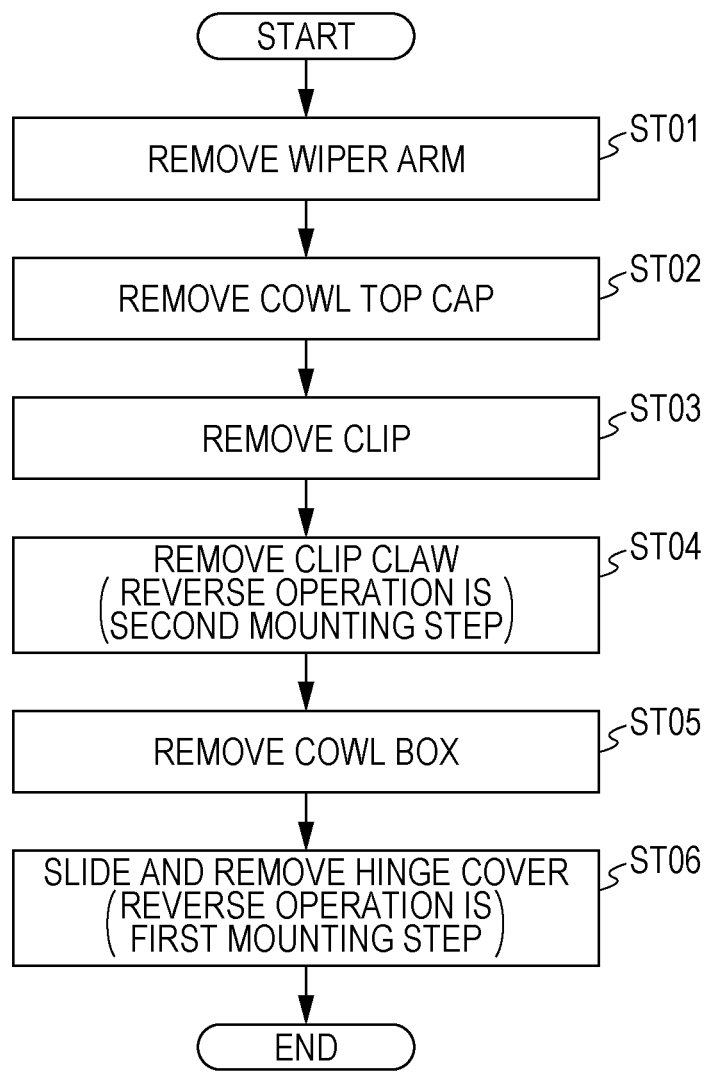
FIG. 17 is a flowchart showing the reverse operation of a method of mounting the hinge cover on the vehicle.

Next, the method of mounting the hinge cover 27 will be described. FIG. 17 illustrates a flowchart for the method of mounting the hinge cover 27. STxx is a step number (see FIGS. 1 to 16 for reference symbols). ST01: remove the wiper arms 35, 36 (see FIG. 1) on the right and left of the wiper device 21 from the drive shafts 33, 34 on the right and left as indicated by arrows A1, A1 illustrated in FIG. 2.

ST02: remove the cowl top caps 57 at two locations from the cowl top 24 as indicated by an arrow A2 illustrated in FIG. 4. ST03: remove the clips 55 at eight locations as indicated by an arrow A3 illustrated in FIG. 4, the clips 55 locking the cowl top 24 to the cowl box 25.

ST04: move the clip lugs 77, 77 of the left hinge cover 27 inwardly along the vehicle width direction as illustrated in FIG. 13, and remove the clip lugs 77, 77 from the locking holes 62, 62 of the cowl top 24 (see FIG. 7) as indicated by arrows A4, A4. Remove the right hinge cover 27 from the locking holes 62, 62 in a similar manner.

Figure 9:
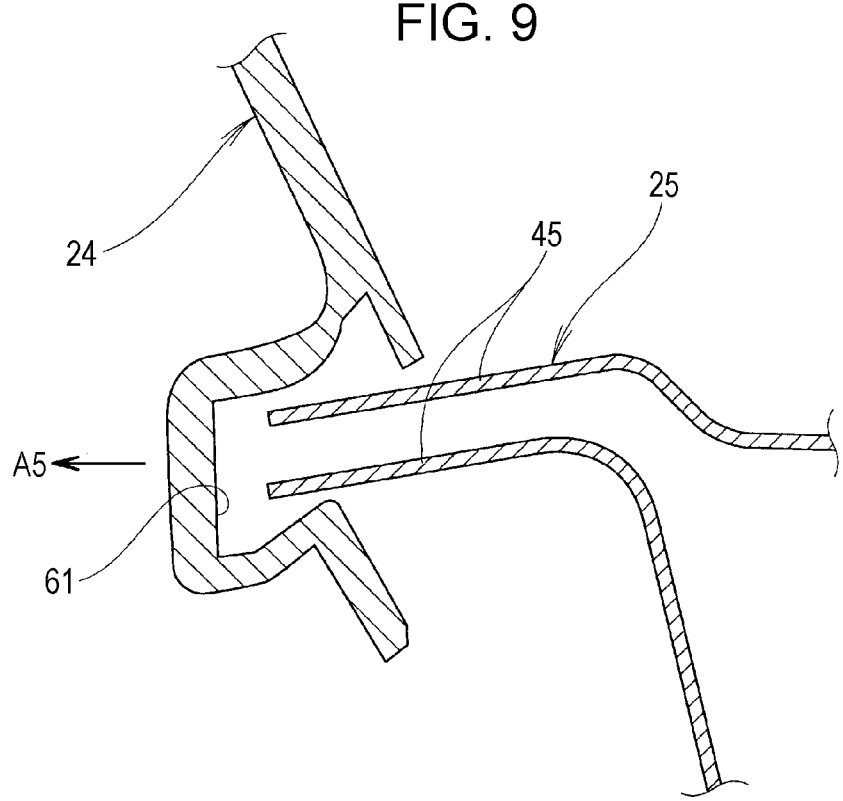
FIG. 9 is a cross-sectional view taken along a line IX-IX in FIG. 8.

ST05: slide the cowl top 24 toward the front of the vehicle as illustrated in FIG. 9, and remove the insertion portion 61 of the cowl top 24 from the projecting portions 45 of the cowl box 25 as indicated by an arrow A5.

Figure 14:
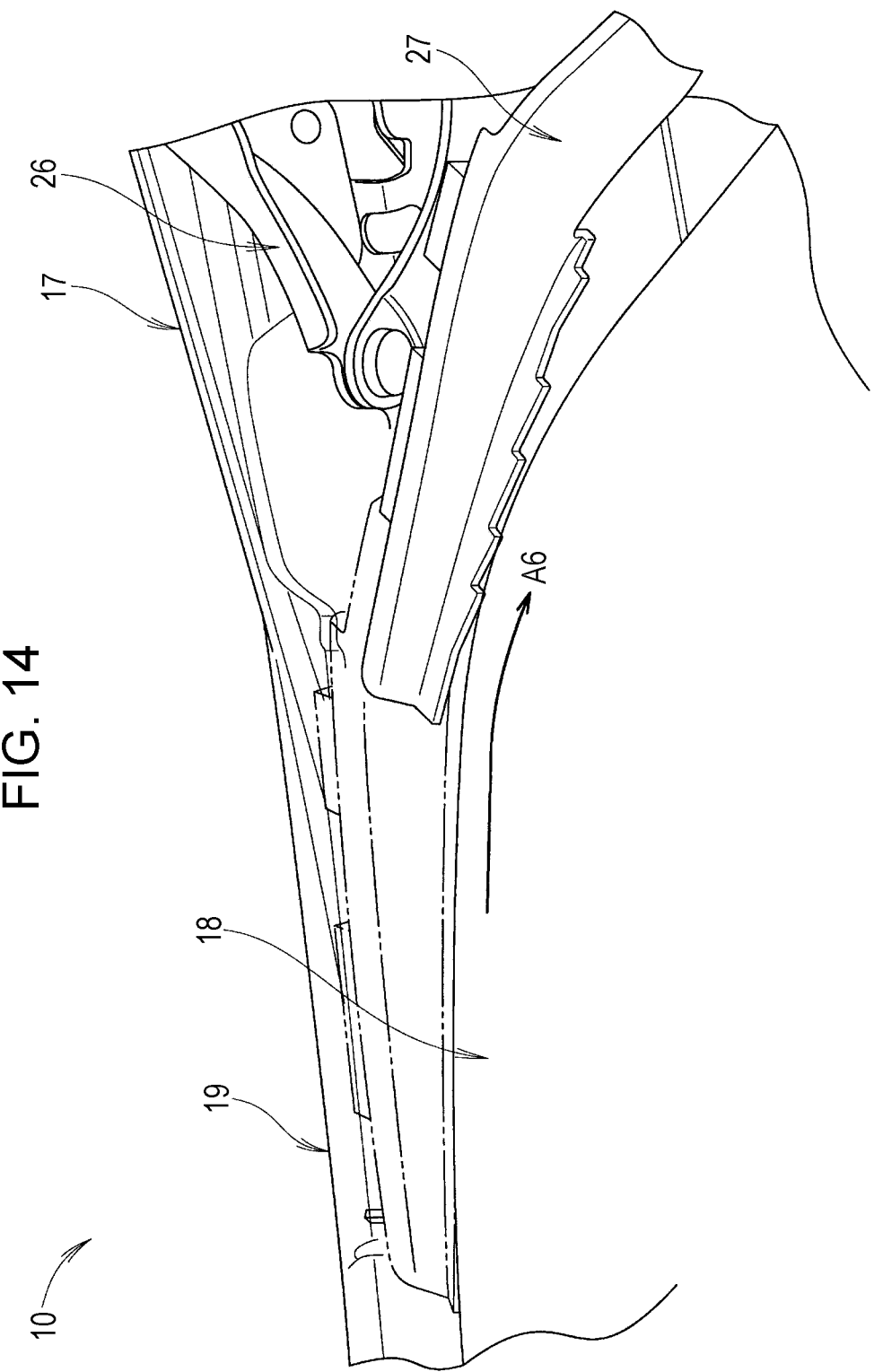
FIG. 14 is a perspective view illustrating a rear fixing part of the vehicle front structure illustrated in FIG. 3.

ST06: move (slide) the left hinge cover 27 along the flange 31 of the front fender 17 frontward of the vehicle and inward in the vehicle width direction as indicated by an arrow A6 illustrated in FIG. 14, and remove the left hinge cover 27 from the windshield glass 18, the front pillar 19, and the front fender 17. Remove the right hinge cover 27 in a similar manner.

When the cowl top 24 is mounted, the reverse operation of each of the above-described steps (ST01 to ST06) should be performed. The reverse operation of ST06 is a first mounting process in which the hinge cover 27 (see FIGS. 6, 10, and 14) is caused to slide rearward with respect to the vehicle along the flange 31, the fitting channels 81, 82 are fitted to the flange 31, and the locking lugs 87 are pressed against the sealing member 44. The reverse operation of ST04 is a second mounting process in which the front fixing portion 71 (see FIGS. 10 and 13) is fixed to the lateral end 53 of the cowl top 24 from the inside in the vehicle width direction.

As illustrated in FIGS. 1 to 17, in the method of mounting a hinge cover on a vehicle, a front structure of the vehicle includes the hinge covers 27 and the front fenders 17 where the hinge covers 27 each cover the lower end corner 18a of the windshield glass 18 at the lateral end 53 of the cowl top 24 provided between the engine hood 16 for covering the engine compartment 13 of the vehicle 10 and the windshield glass 18, and prevents the hood hinge 26 from being seen through the space S1 between the engine hood 16 and the cowl top 24, and the front fenders 17 each of which is located outwardly of the lower end corner 18a of the windshield glass 18, and has the flange 31 which extends below the vehicle from the inner end of vehicle width 17a.

The hinge cover 27 includes the front fixing portion 71 which is fixed to the lateral end 53 of the cowl top 24; and the rear fixing portion 72 which extends from the lateral end 53 of the cowl top 24 rearward with respect to the vehicle, where at the lower end 72b of the rear fixing portion 72, the locking lugs 87 projecting inwardly along the vehicle width direction press against the sealing member 44 which extends in the fore-and-aft vehicle directions of the lateral lower surface 41 and the lateral end surface 42 of the windshield glass 18, and thus the fitting channels 81, 82 at the upper end 72a of the rear fixing portion 72 receive and retain the flange 31 from below, thereby supporting the hinge cover 27.

The method of mounting a hinge cover on a vehicle includes a first mounting process (ST06) in which the hinge cover 27 is caused to slide rearward with respect to the vehicle along the flange 31, the fitting channels 81, 82 are fitted to the flange 31, and the locking lugs 87 are pressed against the sealing member 44; and a second mounting process (ST04) in which the front fixing portion 71 is fixed to the lateral end 53 of the cowl top 24 from the inside in the vehicle width direction.

That is to say, when the hinge cover 27 is mounted, the hinge cover 27 is caused to slide rearward with respect to the vehicle, the fitting channels 81, 82 are fitted to the flange 31, and the locking lugs 87 are pressed against the sealing member 44 in the first mounting process (ST06); and the front fixing portion 71 is fixed to the lateral end 53 of the cowl top 24 from the inside in the vehicle width direction in the second mounting process (ST04).

Accordingly, contact of the hinge cover 27 with the glass design surface 88 of the windshield glass 18 can be prevented. Consequently, sand or the like is not introduced, and even when vibration occurs, blemishes or strange noises can be prevented from being caused. Because the hinge cover 27 does not come into contact with the glass design surface 88 of the windshield glass 18, high water discharge effect can be obtained with the windshield glass 18.

Furthermore, there is no structure for mount in the glass design surface 88 of the windshield glass 18, and thus the entire hinge cover 27 can be formed thinner. Accordingly, the hinge cover 27 does not bulge over the window shield glass 18 side. Consequently, even in the case where the wiper device 21 is of "a tandem type", the influence on the operation range of the wiper can be avoided, and a degree of freedom in design can be increased.

When the hinge cover 27 is removed, the procedure should be performed in order of the second mounting process and the first mounting process, and the hinge cover 27 can be mounted without using a member other than the hinge cover 27. Thus, the mountability and removability of the hinge cover 27 can be improved.

Figure 7:
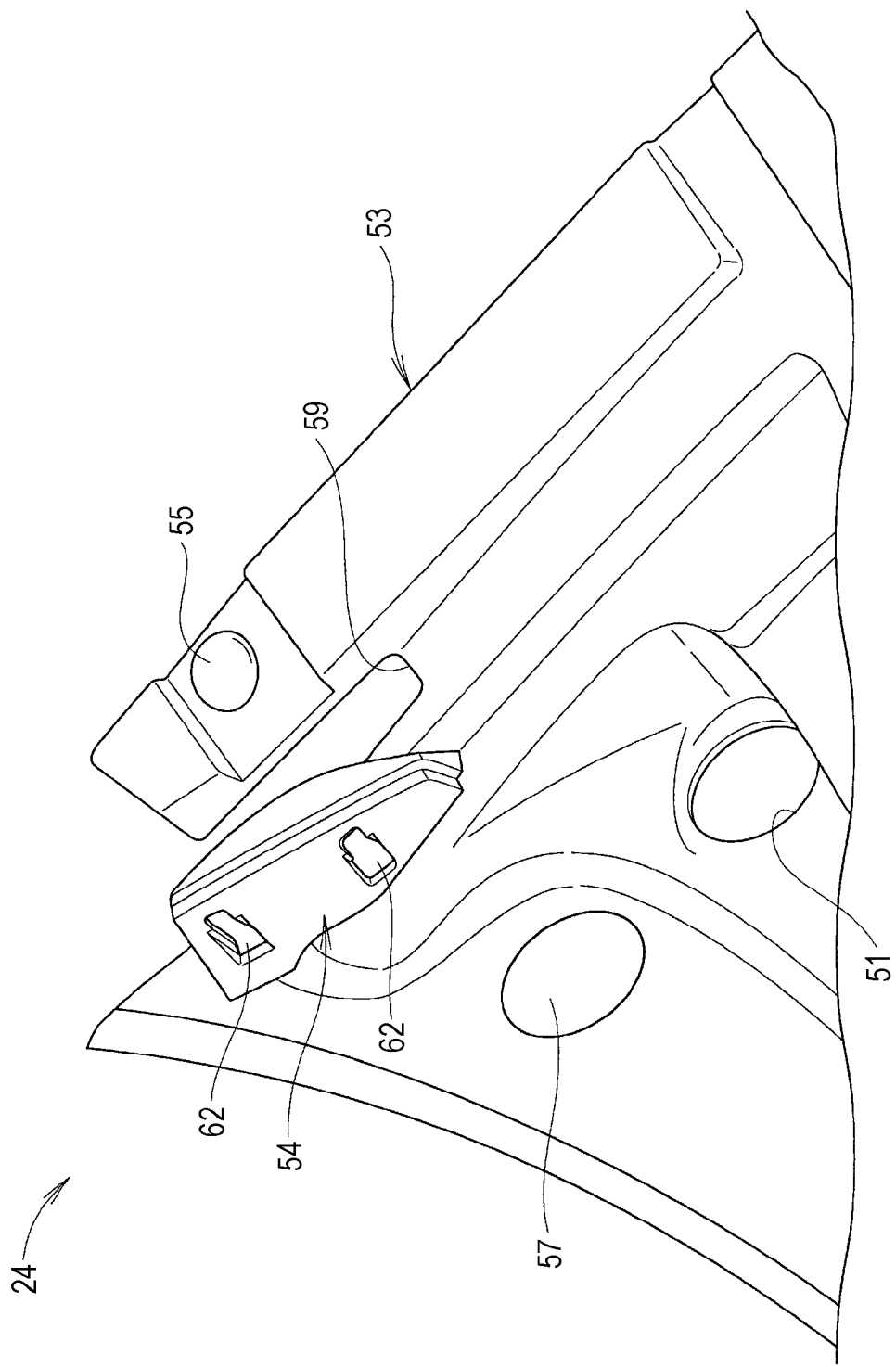
FIG. 7 is a perspective view of the left end of a cowl top of the vehicle front structure illustrated in FIG. 3.
Figure 8:
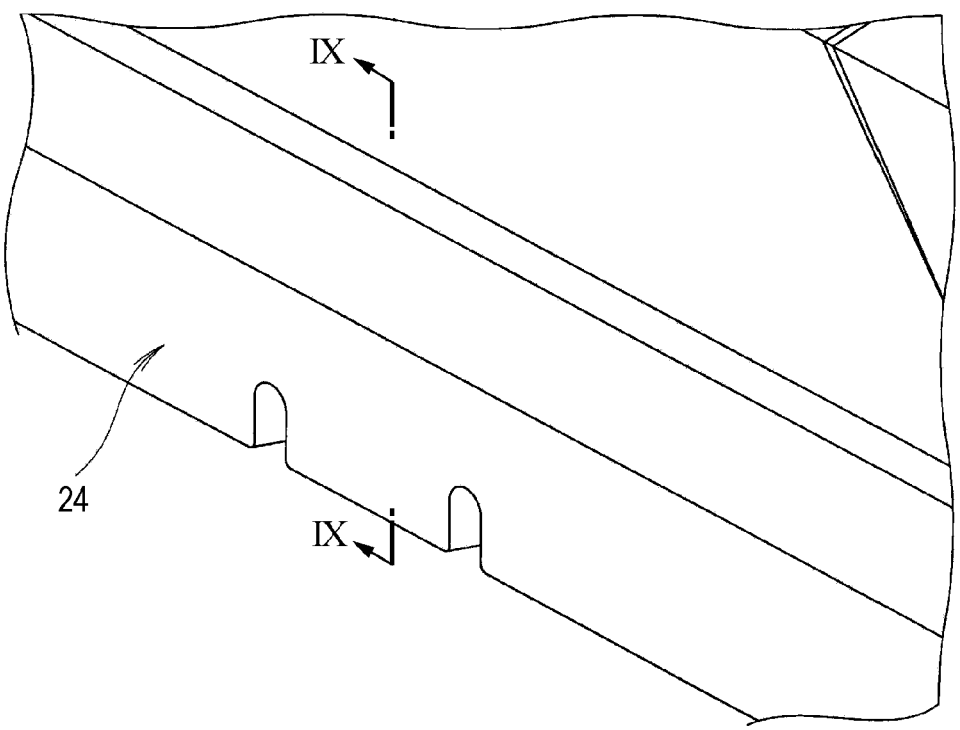
FIG. 8 is an enlarged view of a portion VIII in FIG. 2.

The present disclosure is not limited to the above-described embodiment, and variations and modifications in the shape, arrangement, and number of components may be made without departing from the scope of the present disclosure. In the vehicle front structure according to the present embodiment, as illustrated in FIGS. 7 and 11, the clip lugs 77, 77 are formed on the hinge cover 27, and the locking holes 62 are formed on the cowl top 24, however, without being limited to this, the locking holes may be formed on the hinge cover, and the clip lugs may be formed on the cowl top.

In the vehicle front structure according to the present embodiment, as illustrated in FIG. 11, the first and second fitting channels 81, 82, and the first and second channel supports 83, 84 and formed separately, however, without being limited to this, the fitting channels and the channel supports may be formed continuously.

We claim:

1. A vehicle front structure comprising:
   a hinge cover disposed at a lateral end of a cowl top provided between an engine hood for covering an engine compartment of a vehicle and a windshield glass, wherein the hinge cover is configured to cover a lower end corner of the windshield glass and to prevent a hood hinge from being seen through a space between the engine hood and the cowl top,
   wherein the hinge cover includes a rear fixing portion extending from the lateral end of the cowl top rearward with respect to the vehicle, and supported by a sealing member disposed at a lateral lower surface and a lateral end surface of the windshield glass and extending in fore-and-aft vehicle direction.

2. The vehicle front structure according to claim 1,
   wherein a lower end of the rear fixing portion includes a locking lug projecting inwardly along a vehicle width direction and pressing against the sealing member to support the hinge cover.

3. The vehicle front structure according to claim 1,
   wherein the hinge cover includes a front fixing portion fixed to the lateral end of the cowl top from the inside in the vehicle width direction.

4. The vehicle front structure according to claim 1,
   wherein the vehicle includes a front fender located outwardly of the lower end corner of the windshield glass, the front fender covering a lateral side of the engine compartment and including a flange extending downward from an inner end of the front fender, and
   wherein a design surface of the rear fixing portion is formed along the flange.

5. The vehicle front structure according to claim 4,
   wherein an upper end of the rear fixing portion includes a fitting channel engaged with the flange, and a channel support supporting one side of the fitting channel from the outside in the vehicle width direction, and
   wherein the fitting channel is molded with a raw material softer than the channel support, and receives and retains the flange from below.

6. A method of mounting a hinge cover on a vehicle, the vehicle including a front structure including a front fender and a hinge cover disposed at a lateral end of a cowl top provided between an engine hood for covering an engine compartment of a vehicle and the windshield glass, the hinge cover covering a lower end corner of a windshield glass and preventing a hood hinge from being seen through a space between the engine hood and the cowl top, and the front fender being located outwardly of the lower end corner of the windshield glass and including a flange extending downward from an inner end of the front fender in a vehicle width direction,
   wherein the hinge cover includes a front fixing portion fixed to the lateral end of the cowl top, and a rear fixing portion extending from the lateral end of the cowl top rearward with respect to the vehicle, and
   wherein at a lower end of the rear fixing portion, a locking lug projecting inwardly along the vehicle width direction presses against a sealing member disposed at a lateral lower surface and a lateral end surface of a windshield glass and extending in fore-and-aft vehicle direction, and at an upper end of the rear fixing portion, a fitting channel receives and retains the flange from below to support the hinge cover, the method comprising:
   sliding the hinge cover rearward with respect to the vehicle along the flange to fit the fitting channel to the flange, and pressing the locking lug against the sealing member; and
   fixing the front fixing portion to the lateral end of the cowl top from the inside in the vehicle width direction.

* * * * *